DUAL FEEDBACK DIRECT FREQUENCY MODULATION SYSTEM

Filed Aug. 6, 1962 4 Sheets-Sheet 1

INVENTORS
David B. Hallock
Frank D. McLin
Glenn W. Sellers
BY Moody and Harris
Attorneys

DUAL FEEDBACK DIRECT FREQUENCY MODULATION SYSTEM

INVENTORS
David B. Hallock
Frank D. McLin
Glenn W. Sellers
BY Mooty and Harris
Attorneys

DUAL FEEDBACK DIRECT FREQUENCY MODULATION SYSTEM

Filed Aug. 6, 1962 4 Sheets-Sheet 3

INVENTORS
David B. Hallock
Frank D. McLin
Glenn W. Sellers
BY Moody and Harris
Attorneys

DUAL FEEDBACK DIRECT FREQUENCY MODULATION SYSTEM

Filed Aug. 6, 1962 4 Sheets-Sheet 4

INVENTORS
David B. Hallock
Frank D. McLin
Glenn W. Sellers
BY Moody and Harris
Attorneys United States Patent Office 3,199,028

Patented Aug. 3, 1965

3,199,028
DUAL FEEDBACK DIRECT FREQUENCY MODULATION SYSTEM

Frank D. McLin and Glenn W. Sellers, Cedar Rapids, and David B. Hallock, Marion, Iowa, assignors to Collins Radio Company, Cedar Rapids, Iowa, a corporation of Iowa Filed Aug. 6, 1962, Ser. No. 214,932
6 Claims. (Cl. 325—148)

This invention relates to a dual feedback direct frequency modulation (FM) system suitable for use in a broadcast FM transmitter. More particularly, this invention relates to a direct frequency modulation system that includes an oscillator that is frequency modulated by a wide band of modulating signals, and dual feedback networks for suppressing FM oscillator distortion, incidental FM noise, gain phase variations and both long and short term carrier frequency deviations from a predetermined operational carrier frequency.

As is well known in the art, there are basically two methods for generation of a frequency modulated signal, direct FM and phase modulation. At present, most monophonic broadcast FM transmitters are of the latter type, using crystal control due to the inherent stability thus provided.

While phase modulators can provide stability, this is at least partially off set by low sensitivity characteristics so that even when utilized in monophonic broadcast FM transmitters, such modulators usually must be followed by frequency multipliers. In this type of transmitter, for example, this requirement sometimes is as high as 1000:1. The chief objection to the use of phase modulators and multipliers, over and above added cost and space requirements, is that they limit the noise ratio and distortion performance possible.

While various schemes have been proposed to eliminate, or at least circumvent, the above-stated objections to the phase modulator (such as splitting the modulation into two steps), and thereby make it suitable for use with wide-band modulating signals, the new problems created (such as incorporating into the system phase compensation delay and signal equalization requirements) have prevented these schemes from achieving fully satisfactory results.

The direct frequency modulator, on the other hand, is generally capable of greater dynamic range and frequency response than is a phase modulator. This characteristic of the direct frequency modulator eliminates the need for frequency multipliers and hence makes this type of modulator preferable to the phase modulator where the modulating signals to be encountered may vary over a wide band of frequencies, such as, for example, in stereophonic FM broadcasting where the modulating signal may vary from 50 cycles per second (c.p.s.) to 75,000 c.p.s.

Use of a direct FM modulator does not of itself, however, eliminate the actual distortion encountered, and, in addition, creates other problems, such as carrier frequency instability, for example. While the distortion problem has been solved, at least in part, heretofore, through the use of feedback, and while automatic frequency control networks have been utilized heretofore to stabilize carrier frequencies, no feedback system now known or utilized is capable of doing both by means of dual feedback networks forming parallel feedback loops.

It is therefore an object of this invention to provide an improved feedback system for a direct frequency modulator capable of not only suppressing distortion but also for eliminating both long term and short term carrier frequency deviations from a predetermined operational carrier frequency.

More particularly, it is an object of this invention to provide a direct frequency modulation system having dual feedback networks one of which substantially eliminates distortion and short term carrier frequency deviations from a predetermined operational carrier frequency and the other of which substantially eliminates long term carrier frequency deviations from said predetermined operational carrier frequency.

It is another object of this invention to provide a dual feedback direct FM modulation system including an oscillator that is frequency modulated by a wide-band modulating signal, said system also having a first feedback network for degeneratively feeding back the input modulating signal to the frequency modulating oscillator for suppressing distortion and short term carrier frequency deviations from a predetermined operational carrier frequency, and a second feedback network that is an automatic frequency control network for suppressing long term carrier frequency deviations from said predetermined operational carrier frequency.

With these and other objects in view which will become apparent to one skilled in the art as the description proceeds, this invention resides in the novel construction, combination and arrangement of parts substantially as hereinafter described and more particularly defined by the appended claims, it being understood that such change in the precise embodiment of the herein disclosed invention may be included as come within the scope of the claims.

The accompanying drawings illustrate one complete example of the embodiment of the invention constructed according to the best mode so far devised for the practical application of the principles thereof, and in which.

Figure 1:
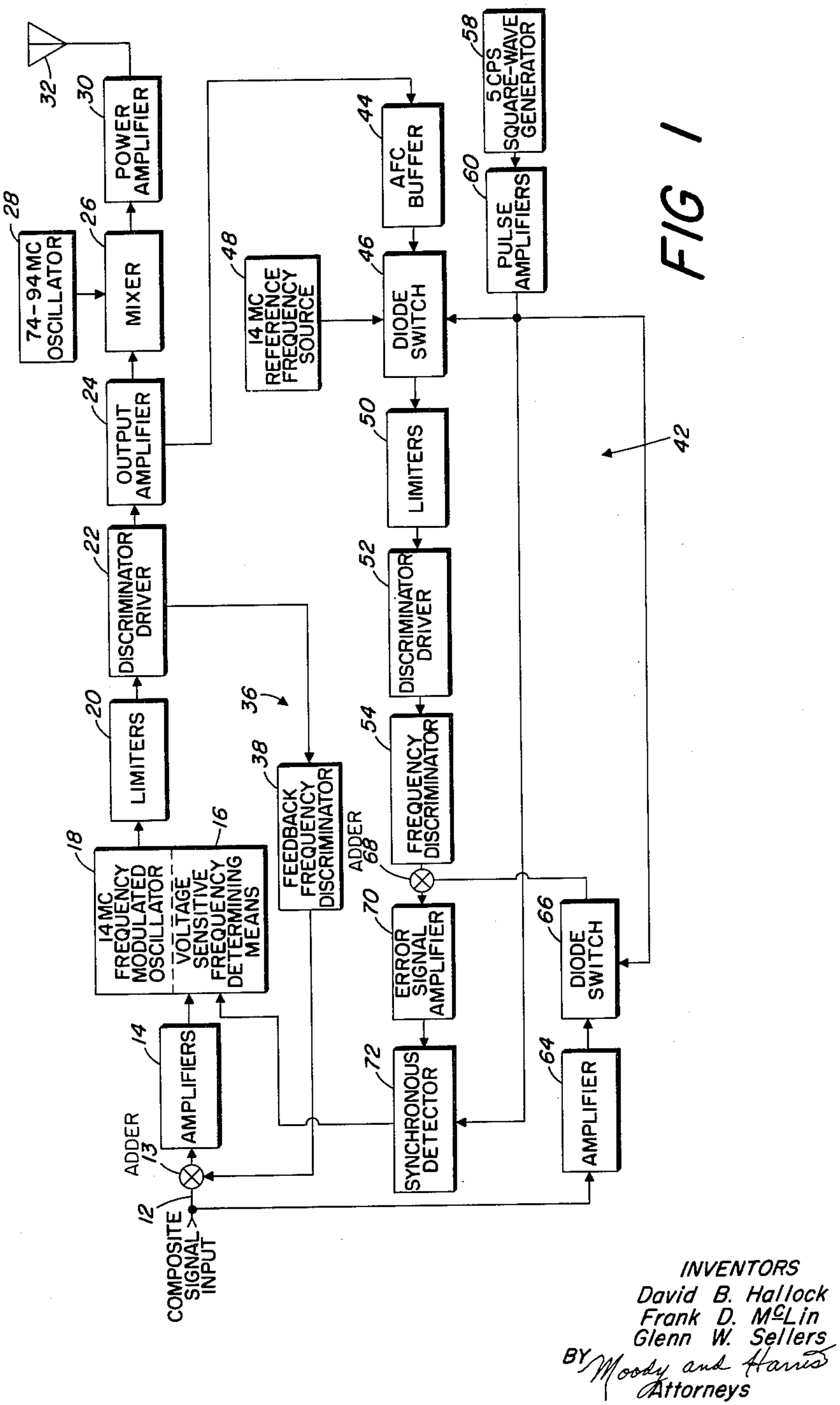
FIGURE 1 is a block diagram of the dual feedback direct frequency modulation system of this invention.

Referring now to the drawings in which like numerals have been used for like characters throughout, and referring particularly to FIGURE 1, an input signal is coupled into the system of this invention through input lead 12. This input signal may, for example, be generated by a stereophonic generator (not shown), and, if so generated, may be a composite signal having components which may vary from 50 c.p.s. to 75,000 c.p.s. It is a feature of this invention that wide-band signals of this type can be used to modulate a carrier without causing appreciable distortion or carrier frequency shift.

As shown best in FIGURE 1, the input modulation signal is coupled by means of lead 12 and adder 13 to conventional amplifiers 14, the output of which is connected to voltage sensitive frequency determining means 16 of direct frequency modulated oscillator 18. As is conventional, voltage sensitive frequency determining means 16 may include a voltage sensitive capacitor (Varicap) 19 (shown in FIGURE 2) which, as is well known in the art, responds to a voltage change impressed thereon to vary the output frequency of the oscillator.

In the absence of a modulating signal input, the output frequency of oscillator 18 is a constant carrier frequency the value of which is governed by frequency determining network 16. As utilized in stereophonic broadcasting, this carrier frequency is preferably 14 megacycles (mc.) as indicated in FIGURE 1. When a modulating signal is being coupled to frequency determining network 16, the output from the oscillator is, of course, a frequency modulated signal.

The frequency modulated output signal from oscillator 18 is coupled through conventional limiters 20 to a conventional discriminator driver 22. The output from driver 22 is then coupled through conventional output amplifier 24 to conventional mixer 26, which mixer also receives the output from oscillator 28. Oscillator 28 is tuned to a frequency which, when added to the carrier frequency generated by oscillator 18, produces the desired transmitting frequency. Thus, if the carrier frequency is 14 mc. and oscillator 28 is tunable between 74 mc. and 94 mc., the transmitting frequency will be within the FM band (88 mc. to 108 mc.). The frequency modulated transmitting signal is then coupled through conventional power amplifier 30 to conventional transmitting antenna 32.

A first, or modulating signal, feedback network 36 is connected from the output of discriminator driver 22 to frequency determining means 16. As shown in block form in FIGURE 1, modulating signal feedback path 36 includes a feedback frequency discriminator 38, the output of which is coupled through adder 13 and amplifier 14 to frequency determining means 16.

A second feedback, or automatic frequency control (AFC) network 42 is connected from the output or output amplifier 24 to frequency determining means 16. As shown in block form in FIGURE 1, the output from output amplifier 24 is coupled through AFC buffer 44 to diode switch 46, which switch also receives an input signal from a reference frequency source 48. As indicated in FIGURE 1, if oscillator 18 has a 14 mc. carrier frequency, then reference frequency source 48 also has a 14 mc. output frequency.

The output from diode switch 46 is coupled through limiters 50 and discriminator driver 52 to frequency discriminator 54. Diode switch 46 is pulsed to alternately pass the output from oscillator 18 (through limiters 20, amplifiers 22 and 24 and AFC buffer 44) and the output from the 14 megacycle reference source 48.

The pulses for controlling diode switch 46 are generated by means of square wave generator 58, the output of which is coupled through pulse amplifiers 60. A low frequency switching rate is established by square wave generator 58, which rate, as indicated in FIGURE 1, may be 5 c.p.s.

Frequency discriminator 54 receives the reference source signal and the frequency modulated signal from oscillator 18 (alternately by means of switch 46) and in response thereto develops a square wave error signal output the amplitude of which is proportional to the amount of deviation between the carrier frequency from oscillator 18 and the reference frequency (if modulation at the output of oscillator 18 is zero).

If the output of oscillator 18 is frequency modulated, the amplitude of the error signal is also affected by the modulation. This error may be cancelled, however, by properly coupling the modulating signal input through amplifier 64 and diode switch 66 to adder 68 at the output of the frequency discriminator. Diode switch 66 also receives the output of square wave generator 58 to pass the cancelling signal only when discriminator 54 receives the output from oscillator 18 through diode switch 46. For cancellation purposes, the phase of the modulating signal passed by switch 66 is opposite to that of the signal coupled to discriminator 54 from oscillator 18.

The error signal is then coupled through error signal amplifier 70 to synchronous detector 72, which detector also receives the output from square wave generator 58. The D.-C. voltage output from synchronous detector 72 is then coupled to frequency determining means 16, and, in conventional manner, causes the output carrier frequency of oscillator 18 to be adjusted until long term carrier fequency deviations are eliminated. The AFC loop drives the amplitude of the square wave error signal toward zero by driving oscillator 18 toward the reference source frequency rather than to the discriminator 54 center frequency. In this way, tuning of discriminator 54 does not determine the reference frequency.

Figure 2:
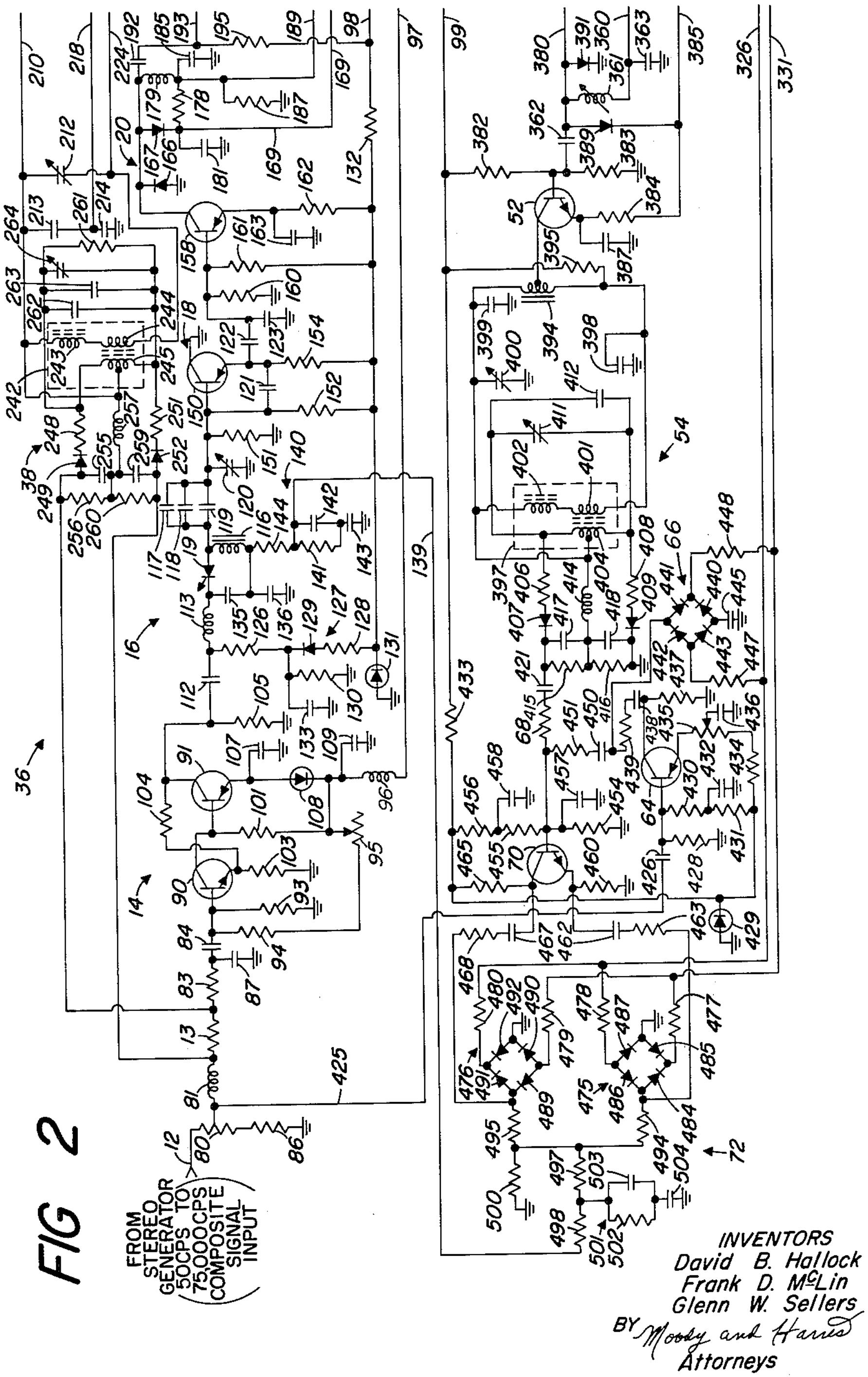
FIGURE 2 is a portion of the complete schematic diagram of this invention.

As shown in detail in FIGURE 2, the modulating signal input is coupled to amplifiers 14 through lead 12, variable resistor 80, inductor 81, adder resistor 13, resistor 83 and capacitor 84. In addition, the free end of resistor 80 is connected to ground through resistor 86, while the junction of resistor 83 and capacitor 84 is connected to ground through capacitor 87. Capacitor 87, taken in conjunction with the resistive elements of the circuit, serves to provide high frequency roll-off in summing the input signal with the feedback signal in modulating signal feedback path 36.

Amplifiers 14 include a pair of transistors 90 and 91, the base of NPN type transistor 90 being connected to capacitor 84 (to receive the modulating input signal), and the base of PNP type transistor 91 being connected directly to the collector of transistor 90. The base of transistor 90 is also connected to the junctions of resistors 93 and 94, which resistors are serially connected between ground and a +20 volt D.-C. power source (not shown) through variable resistor 95, inductor 96 and leads 97, 98 and 99. In like manner, the base of transistor 91 is connected to the +20 volt power supply through resistor 101, inductor 96 and leads 97, 98 and 99.

The emitter of transistor 90 is connected to ground through a resistor 103 and to the collector of transistor 91 through resistor 104, while the collector of transistor 91 also has a ground return path through resistor 105. The emitter of transistor 91 has a bypass capacitor 107 to ground and is connected to the +20 volt power supply through voltage breakdown, or Zener diode 108, inductor 96 and leads 97, 98 and 99. Zener diode 108 drops the emitter voltage of transistor 91 as required for direct coupling, and may, for example, have a 5 volt breakdown voltage to supply 15 volts to the emitter of transistor 91. Zener diode 108 also has a bypass capacitor 109 to ground at the power supply connected end.

The output from amplifier 14 is taken from the collector of transistor 91 and coupled through blocking capacitor 112 and R-F isolation choke 113 to voltage sensitive frequency determining network 16. Network 16 includes voltage variable silicon capacitor, or Varicap, 19, inductor 116, temperature compensating capacitors 117, 118 and 119, trimming capacitor 120, and voltage dividing capacitors 121, 122 and 123. Voltage sensitive capacitor 19 is biased to a nominal 6.4 volts D.-C. through resistor 126 connected to divider 127 (that includes resistor 128, diode 129 and resistor 130), which divider is connected to a +8.4 volt reference power supply (this reference power supply being provided by Zener diode 131 and resistor 132, which resistor is connected to leads 98 and 99). Diode 129 is forward biased and has a voltage drop versus temperature characteristic to compensate for the capacitance versus temperature variation of voltage variable capacitor 19. In addition, a voltage reference noise filter capacitor 133 is connected to the junction of resistor 126 and diode 129, while the junction of inductor 113 and voltage variable capacitor 19 is connected to ground through serially connected capacitors 135 and 136.

The second, or AFC feedback network 42 is connected to voltage variable capacitor 19 through lead 139, filter 140 (consisting of resistor 141, capacitor 142 and capacitor 143), resistor 144 and inductor 116. In addition, the junction of resistor 144 and inductor 116 is connected to the junction of capacitors 135 and 136, the former of which is connected at the opposite side to the other side of the voltage variable capacitor 19, Frequency determining means 16 is determinative of the output frequency of the direct frequency modulated oscillator 18. As shown in FIGURE 2, this network is connected to the base of transistor 150 of the frequency modulated oscillator. In addition, the base of transistor 150 is connected to the junction of resistors 151 and 152, the former of which is connected to ground and the latter of which is connected to the +8.4 volt reference power supply. The collector of transistor 150 is grounded and the emitter is connected to the +8.4 volt reference power supply through resistor 154.

The output from oscillator 18 is taken from the junction of capacitors 122 and 123 (emitter circuit) and coupled to the base of transistor 158 (first limiter). The base of transistor 158 is also connected to the junction of resistors 160 and 161, the former of which is connected to ground and the latter of which is connected to the +8.4 volt reference power supply. In addition, the emitter of transistor 158 is connected to the +8.4 volt reference power supply through resistor 162, the junction of resistor 162 and the emitter also having a bypass capacitor 163 to ground.

The collector of transistor 158 has connected thereto a pair of oppositely poled peak clipping diodes 166 and 167, the former of which has its anode connected to ground and the latter of which has its cathode connected by means of lead 169 to the cathode of peak limiting diode 170 (the anode of which is connected to the collector of second limiter transistor 172), through resistor 173 and inductor 174 to the emitter of discriminator driver 22, and through resistor 178 and inductor 179 back to the collector of transistor 158. A bypass capacitor 180 to ground is also connected to the junction of resistor 173 and inductor 174, while a bypass capacitor to ground 181 is connected to the cathode of diode 167, and another bypass capacitor 185 to ground is connected to the junction of resistor 178 and inductor 179. The junction of resistor 178 and inductor 179 is also connected to one side of resistor 187 (the other side of which is grounded) and to variable inductor 188 (the other side of which is connected to the collector of transistor 172) through lead 189.

The output from the first limiter is coupled from the collector of transistor 158 through coupling capacitor 192 and lead 193 to the base of second limiter transistor 172. The base of transistor 172 is connected to the junction of resistors 194 and 195, the former of which is connected to ground and the latter of which is connected to the +20 volt power supply through leads 98 and 99. In addition, the base of transistor 172 has a voltage dividing capacitor 196 one side of which is grounded and the other side of which is connected in series with capacitor 192. The emitter of transistor 172 is connected to the +20 volt power supply through resistor 197 and leads 98 and 99, the emitter also having a bypass capacitor 198 to ground.

The second limiter has oppositely poled diodes 170 and 200 connected to the collector of transistor 172, as did the first limiter, and the output from the collector is taken through coupling capacitor 201 to the base of discriminator driver transistor 22. The base of transistor 22 is connected to the junction of resistors 203 and 204, the former of which is connected to ground and the latter of which is connected to the +20 volt power supply through leads 98 and 99. The emitter of transistor 22, in addition to being connected to inductor 174, as brought out hereinabove, also has a bypass capacitor 206 to ground.

The output from the second limiter is taken from the collector of transistor 22 through lead 210 to the input side of frequency discriminator 38 in modulating signal feedback network 36. The primary of this discriminator is capacitively tapped by capacitors 212, 213 and 214 to provide emitter drive for output amplifier 24, the junction of capacitors 213 and 214 being connected to the emitter of transistor 24 by means of lead 218.

Transistor 24 is a grounded base amplifier, the output of which is matched to 50 ohms. The emitter of transistor 24 is connected to ground through resistor 220, while the base is connected to ground through parallel connected resistor 221 and capacitor 222. The base of transistor 24 is connected to the +20 volt power supply through leads 98 and 99, lead 224, inductor 226, capacitor 227 (to ground), and resistors 228 and 229. In addition, the collector of transistor 24 is connected to the junction of resistors 228 and 229 through variable inductor 231, and to ground through capacitor 232.

The output from transistor 24 is taken from the collector through coupling capacitor 234 and low pass filter 235, which filter includes capacitor 236, inductor 237, and capacitor 238. Low pass filter 235 attenuates harmonics of the 14 megacycle signal. The output from this filter is then coupled to mixer 26.

Referring now to modulating signal feedback circuit 36, frequency discriminator 38 is of the Foster-Seely type and includes transformer 242 having primary windings 243 and 244 and center tapped secondary winding 245. Primary winding 244 is for coupling while winding 243 is a separate inductor with enough inductance to satisfy the necessary primary inductance value. As shown in FIGURE 2, one side of the primary is connected to receive the output from discriminator driver 22 through lead 210 while the other side is connected to the power supply through lead 224.

Secondary winding 245 of transformer 242 has connected at one side a resistor 248 and serially connected diode detector 249, while the other side of secondary winding 245 has connected thereto a resistor 251 and a serially connected diode detector 252. By this arrangement, diode detectors 249 and 252 are caused to be swamped by resistors 248 and 251, resulting in a marked improvement in the linearity of the discriminator. The output of detectors 249 and 252 are connected to opposite sides of adder resistor 13. In addition, parallel connected capacitor 255 and resistor 256 are connected at one side to the anode of diode 249 and at the other side to one side of inductor 257, the other side of which inductor is connected to the center tap of secondary winding 245 and to lead 210. In like manner, parallel connected capacitor 259 and resistor 260 are connected at one side to the anode of diode 252 and at the other side to inductor 257. Secondary winding 245 also has parallel connected resistor 261 and capacitors 262, 263 and 264 (variable) connected in parallel therewith.

Modulating signal feedback network 36 may be characterized as a type zero servo mechanism and analyzed by means of gain-phase plots familiar to the servo design field. Network 36 supplies a degenerative feedback through amplifying stages 14 to the voltage sensitive frequency determining means 16.

Equally important to suppression of distortion is the requirement that the modulating signal feedback loop reduce transient, or short term, carrier frequency shifts since these shifts cannot be handled by automatic frequency control network 42. In meeting this requirement, as well as stability problems and a need to reduce modulation harmonics distortion by about ten times, 20 decibels of degenerative feedback proved to be satisfactory.

Figures 5, 6:
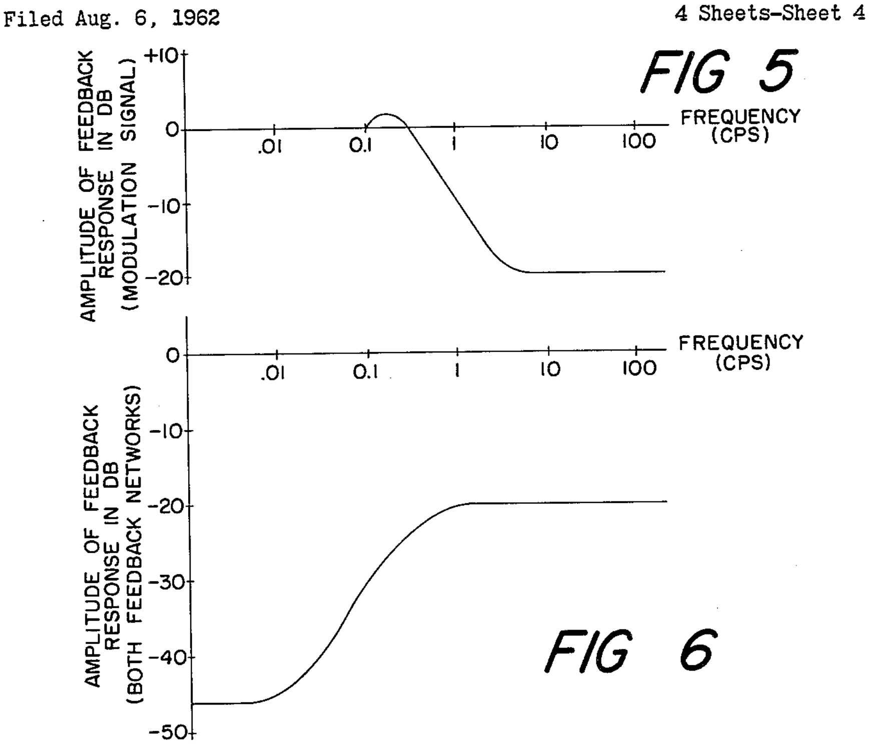
FIGURE 5 is a graphical presentation illustrating the frequency response of the modulating signal feedback network only.
FIGURE 6 is a graphical presentation illustrating the feedback response of both feedback networks and the interaction therebetween.

To be stable, a feedback system requires one predominant internal corner frequency so that the loop gain is well below unity as the open loop phase shift reaches 180°. An additional requirement for at least some purposes is that the closed loop distortion cannot be allowed to rise appreciably at the upper frequency modulator signal limit (75 kilocycles for stereophonic FM broadcasting). With this in mind, it was decided that the predominant high frequency corner should be such that 6 db of feedback would be present at 100 kc. The modulator feedback loop was then developed with this in mind and the resulting circuit designed (having a high frequency roll-off corner at 23 kilocycles). The graphical response plot of the modulating signal feedback network (closed loop) is shown in FIGURE 5.

The second, or automatic frequency control (AFC) feedback network 42 corrects long term frequency shifts rather than transient, or short term frequency shifts (which are reduced by the modulating signal feedback network 36). The input to the AFC network 42 is obtained by coupling an output from the collector of transistor 24 (output amplifier) to the base of buffer amplifier 44 through resistor 271. The emitter of transistor 44 is connected to the +20 volt D.-C. power supply through resistor 272 and leads 98 and 99, and to ground through bypass capacitor 273. The base of transistor 44 is also connected to ground through resistor 274. Resistors 271 and 274 act both as a biasing network for the transistor and as an R-F attenuator since the A.C. collector voltage of transistor 44 is about six volts R.M.S. This attenuation and the large number of stages between the oscillator and output reduce oscillator frequency changes caused by variation of output loading. The AFC buffer is preferably matched to 50 ohms and supplies about 0.1 volt R.M.S. output.

Figures 3, 4:
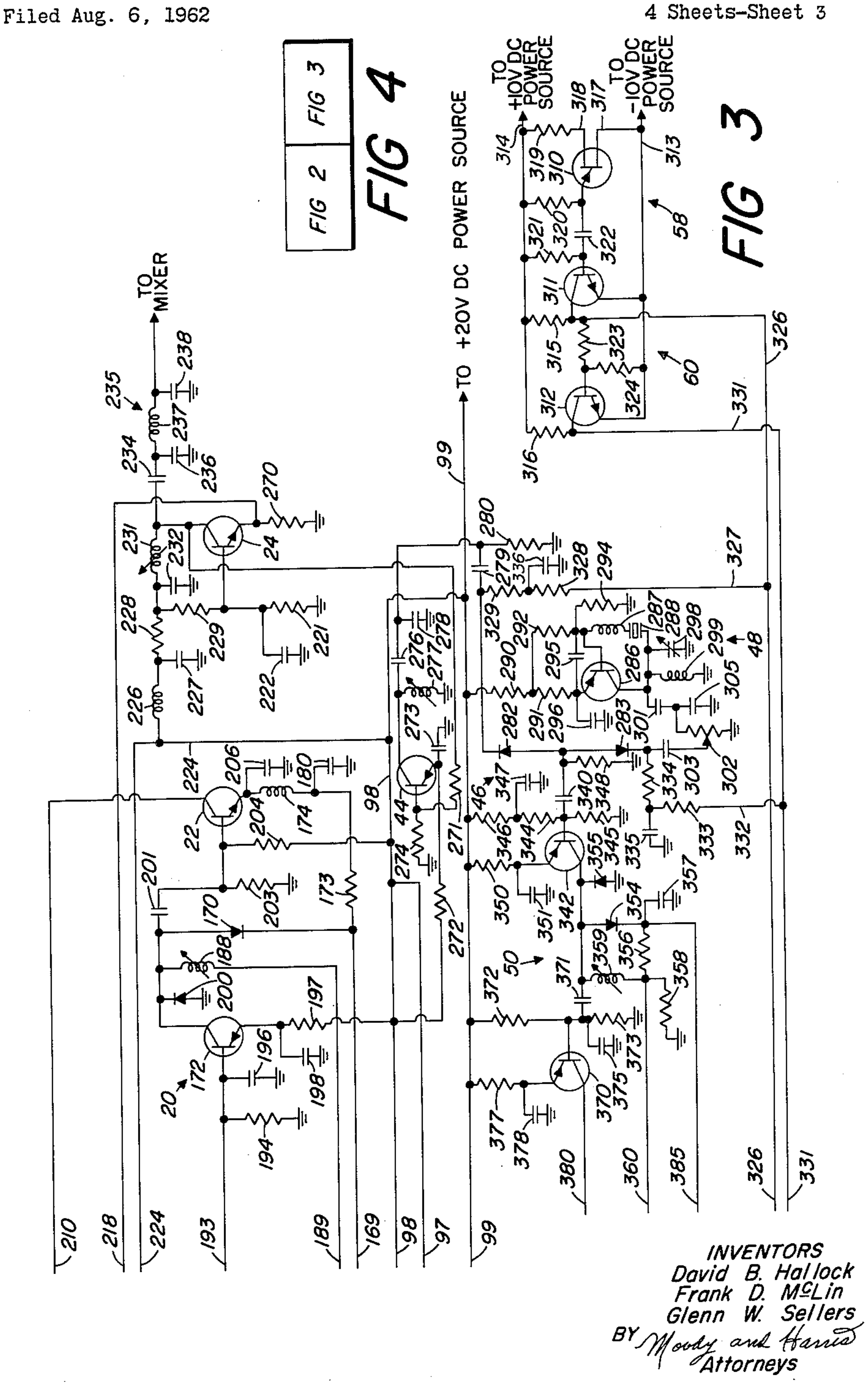
FIGURE 3 is the second portion of the complete schematic diagram of this invention.
FIGURE 4 illustrates proper placement of FIGURES 2 and 3 for viewing the complete schematic diagram of the dual feedback direct FM modulation system of this invention.

The output signal from transistor buffer amplifier 44 is taken from the collector through capacitor 276 and capacitor 279 to diode switch 46. In addition, grounded inductor 277 and grounded capacitor 278 are connected to opposite sides of capacitor 276, while resistor 280 is connected in parallel with capacitor 278 to provide loading. Diode switch 46 includes, as shown in FIGURE 3, a pair of diodes 282 and 283, the anode of diode 282 being connected to the anode of diode 283 and the cathode of diode 282 being connected to buffer amplifier 44 through capacitor 279.

A second input to diode switch 46 is from 14 mc. reference frequency source 48. This reference source is preferably a crystal controlled oscillator including transistor 286 having an inductor 287 and 14 mc. crystal 288 serially connected in the base-collector circuit. The emitter of transistor 286 is connected to the +20 D.-C. volt power supply through series connected resistors 290 and 291, while the base is connected to the +20 volt D.-C. power supply through resistors 290 and 292 and to ground through resistor 294. In addition, a capacitor 295 is connected between the emitter and base with the emitter also having a capacitor 296 to ground, while a variable capacitor 298 and inductor 299, connected in parallel, are connected between the collector-crystal junction and ground.

The output from the 14 megacycle reference source is taken through coupling capacitor 301, variable resistor 302 and coupling capacitor 303 to diode gate 46 and more particularly to diode 283 therein. In addition, the junction of capacitor 301 and resistor 302 has a capacitor 305 connected to ground.

Diode switch 46 is alternately switched to pass either the 14 megacycle reference signal or the output from frequency modulated oscillator 18. Switching is controlled by a keying low frequency square wave generator 58, which generator produces square wave pulses at a 5 c.p.s. switching rate.

As shown in FIGURE 3, keying generator 58 is, in essence, a multivibrator that includes unijunction transistor 310 and the emitter-base diode of transistor 311. Transistors 311 and 312 serve as pulse amplifiers for the generated square wave signal. The square wave signal thus produced has amplitude peaks of between about −10 volts on the negative swing and +8 volts on the positive swing. During the negative swnig, pulse amplifiers 311 and 312 saturate to provide low output impedance to the −10 volts D.-C. power supply (not shown) through lead 313 and on the positive swing amplifiers 311 and 312 are cut off so that the peaks are determined by the +10 volt power supply (not shown) through lead 314 and collector resistors 315 and 316.

Unijunction transistor 310 has one base 317 connected to the −10 volt D.-C. power source through lead 313, as are the emitters of transistors 311 and 312, while the other base 318 of unijunction transistor 310 is connected to the +10 voltage D.-C. power source through resistor 319. The emitter of unijunction transistor 310 and the base of transistor 311 are also connected to the +10 volt power supply through resistors 320 and 321, respectively, said emitter and base also having capacitor 322 connected therebetween. The base of transistor 312 is connected to the +10 volt power supply through resistors 315 and 323 and to the −10 volt power supply through resistor 324.

The output from transistor 311 is coupled from the collector thereof by means of leads 326 and 327, resistor 328 and resistor 329 to the cathode of diode 282, while the output from the collector of transistor 312 is coupled by means of leads 331 and 332, resistor 333 and resistor 334 to the cathode of diode 283. In addition, bypass capacitors 335 and 336 are connected to the junctions of resistors 333–334 and 328–329, respectively.

The output from diode gate 46 is taken from the commonly connected anodes of diodes 282 and 283 and coupled through coupling capacitor 340 to the base of transistor 342 in limiter stage 50. The base of transistor 342 is connected to the junction of resistors 344 and 345, which resistors are serially connected along with resistor 346 between the +20 volt power supply and ground. A bypass capacitor 347 is connected between the junction of resistors 344 and 346, while a resistor 348 is connected to the anodes of diodes 282 and 283. The emitter of transistor 342 is connected to the junction of resistor 350 and capacitor 351, the former of which is connected to the +20 volt power supply and the latter to ground.

The collector of transistor 342 has connected thereto a pair of diode peak clippers 354 and 355, which diodes are oppositely poled in the same manner as described hereinabove with respect to the previous limiting stage 20. The cathode of diode 354 is connected to one side of resistor 356, the junction of which also has a bypass capacitor 357 connected to ground. The side of resistor 356 opposite to that connected to diode 354 is connected to one side of resistor 358 (the other side of which is connected to ground), to one side of variable inductor 359 (the other side of which is connected to the anode of diode 354), and by means of lead 360, variable inductor 361 and capacitor 362 to the base of discriminator driver 52. Lead 360 has a bypass capacitor 363 connecting the same to ground.

The output from first limiter transistor 342 is coupled from the collector to the base of the second transistor limiter 370 through coupling capacitor 371. The base of transistor 370 is also connected to the junction of resistors 372 and 373, the former of which is connected to the +20 volt D.-C. power supply and the latter of which is connected to ground. Capacitor 375 is connected in parallel with resistor 373. In addition, the emitter of transistor 370 is connected to the +20 volt power supply through resistor 377 with the emitter also having bypass capacitor 378 to ground.

The output from the second limiter is coupled through lead 380 and capacitor 362 to the base of discriminator driver transistor 52. The base of transistor 52 is also connected to the junction of resistors 382 and 383 connected in series between ground and the +20 volt power supply, the former being connected by means of lead 99. The emitter of transistor 52 is connected by means of resistor 384 and lead 385 to the junction of diode 354 and resistor 356, and to one side of bypass capacitor 387, the other side of which is grounded. In addition, a diode 389 is connected between capacitor 362 and resistor 384, while a diode 391 is connected between ground and lead 380.

The output from discriminator driver 52 is taken from the collector and coupled to frequency discriminator 54, and more particularly to the tap of autotransformer 394 therein. One side of autotransformer 394 is connected through resistor 395 and lead 99 to the +20 volt power supply and to one side of the primary windings of transformer 397, while the other side of autotransformer 394 is coupled to the other side of the primary windings of transformer 397. In addition, the primary winding transformer input connections have bypass capacitor 398 and tuning capacitors 399 and 400 (variable) connected thereto as shown in FIGURE 2.

Transformer 397 includes two primary windings 401 and 402 (for the same purposes as described hereinabove with respect to transformer 242 in the modulating signal feedback path) and a secondary winding 404. Secondary winding 404 is center tapped and has one side connected through resistor 406 to diode detector 407 and the other side connected through resistor 408 to diode detector 409. In addition, capacitors 411 (variable) and 412 are connected between the two ends of the secondary winding.

The center tap of secondary winding 404 is connected to one side of primary winding 402, to autotransformer 394, and through coil 414 to one side of resistors 415 and 416 and capacitors 417 and 418. Resistor 415 and capacitor 417 are connected in parallel with one another and connected to the cathode of diode 407, while resistor 416 and capacitor 418 are connected in parallel with one another and connected to ground as is the cathode of diode 409.

A square wave output error signal is taken from the cathode of diode 407 of frequency discriminator 54, and the amplitude of the square wave output signal is dependent upon the deviation of the carrier frequency from oscillator 18 with respect to the reference frequency supplied to the discriminator from source 48. If the signal from oscillator 18 has no frequency modulation thereon, the amplitude variations will be proportional to the deviation from the reference frequency. If the output is frequency modulated, however, then the amplitude variations will also reflect this modulation. The error signal output from discriminator 54 is coupled through capacitor 421 and adder resistor 68 to the base of error signal amplifying transistor 70. Although shown herein as a single stage amplifier, it is to be appreciated, of course, that additional amplifying stages could be added, as deemed necessary or desirable.

The amplitude variations due to carrier modulation are eliminated from the error signal prior to amplification by amplifier stage 70 by coupling the original modulating signal to the output side of frequency discriminator 54 in opposite phase to the variations on the error signal due to carrier modulation received at the discriminator input side.

As shown in FIGURE 2, the modulating signal is taken from the junction of resistor 80 (tap) and inductor 81 and coupled by means of lead 425 and capacitor 426 to the base of amplifying transistor 64. The base of transistor 64 is also connected to the junction of resistors 428 and 430, which resistors are serially connected with one another and with resistor 431 between ground and a +15 volt D.-C. supply of power (said power supply being controlled by Zener diode 429 and resistor 433). A bypass capacitor 432 is also connected to the junction of resistors 430 and 431. The emitter of transistor 64 is connected to the 15 volt D.-C. power supply through resistors 434 and 435, the latter of which has a variable tap connected to grouned capacitor 436. The collector of transistor 64 has a resistor 437 to ground, with the output of the transistor being taken from the junction of the collector and resistor 437 through coupling capacitor 438 and resistor 439 to diode switch 66.

Diode switch 66 includes four diodes 440, 441, 442 and 443 with the junction of diodes 441 and 442 being connected to resistor 439 and the junction of diodes 440 and 443 being connected to ground through capacitor 445. Diode switch 66 is connected to low frequency keying generator 58 by means of lead 326 and 331 connected to resistors 447 and 448, respectively, which resistors are then connected to the junction of diodes 442–443 and 440–441, respectively.

Diode gate 66 is poled so that the original input signal is coupled through gate, or switch, 66 only when the signal received at frequency discriminator 54 is from oscillator 18.

The amplified and inverted modulating signals when passed by the gate 66 are coupled through capacitor 450 and resistor 451 to the junction of the base of transistor 70 and resistor 68 where the signal is used to cancel the amplitude variations in the error signal from frequency discriminator 54 that resulted from the modulation on the output of oscillator 18. The result of this cancellation is that the error signal coupled to the base of transistor 70 has only amplitude variations thereon proportional to the deviation of the carrier frequency (from oscillator 18) with respect to the reference frequency from source 48.

The base of transistor 70 is connected to the junction of serially connected resistors 454 and 455, which resistors are connected in series with resistor 456 between the +15 D.-C. volt power supply and ground. Resistor 454 has a capacitor 457 connected in parallel, while the junction of resistors 455 and 456 has a grounded capacitor 458 connected thereto.

A resistor 460 is grounded at one side and has the other side connected to the emitter of transistor 70. In addition, this emitter is connected by means of capacitor 462 and resistor 463 to one side of synchronous detector 72. The collector of transistor 70 is connected to the +20 volt D.-C. power supply through resistor 465, and to synchronous detector 72 through capacitor 467 and resistor 468.

The function of synchronous detector 72 is to recover the information contained in the amplitude and phase of the five cycle per second error signal coupled from error signal amplifier 70. The output from the synchronous detector is a D.-C. voltage, the amplitude of which is proportional to the amplitude of the input error signal and the polarity of which is determined by the phase of the input error signal.

As shown in FIGURE 2, synchronous detector 72 is balanced and operates from opposite half cycles of the synchronous input coupled from generator 48 (to thus balance out the low frequency keying pulses).

As shown in FIGURE 2, the 5 c.p.s. signal from generator 58 is coupled by means of leads 326 and 331 to the two diode switching circuits 475 and 476 through resistors 477, 478, 479 and 480. Resistor 477 is connected to the junction of the cathodes of diodes 484 and 485 of switching circuit 475, while resistor 478 is connected to the junction of the anodes of diodes 486 and 487. In like manner, resistor 479 is connected to the junction of the anodes of diodes 489 and 490 of switching circuit 476, while resistor 480 is connected to the junction of the cathodes of diodes 491 and 492. The collector of transistor 70 is connected with the junction of diodes 489 and 491 (cathode and anode respectively) through resistor 468 and capacitor 467, while the emitter of transistor 70 is connected with the junction of diodes 484 and 486 (anode and cathode, respectively) through resistor 463 and capacitor 462. In addition, the junction of diodes 485 and 487 (anode and cathode, respectively) is grounded as is the junction of diodes 490 and 492 (cathode and anode, respectively).

The output from synchronous detector 72 is taken from the junction of diodes 484 and 486 and from the junction of diodes 489 and 491 through resistor 494 (connected to diodes 484 and 486) resistor 495 (connected to diodes 489 and 491), resistors 497 and 498, and lead 139 to the voltage sensitive frequency determining network 16. The junction of resistors 494 and 497 has connected thereto a grounded resistor 500, while a filter 501 (including parallel connected resistor 502 and capacitor 503 connected in series with grounded capacitor 504) is connected to the junction of resistors 497 and 498.

Synchronous detector 72 ignores the non-synchronous low frequency terms and also provides an output that is free of any double sideband terms. This is accomplished by clamping one side of the wave form to ground by means of diode switches 475 and 476. When a diode switch is closed, the connected capacitor (either capacitor 462 or 467) is discharged, the time constant of the discharge path being such that substantially complete discharge occurs. This results in only synchronous amplitude variations being coupled by the detector, all non-synchronous amplitude variations being ignored. The double sideband terms are removed without further appreciable filtering by use of a balanced synchronous detector, as shown herein.

The automatic frequency control network shown and described herein forms the subject matter of copending United States Patent Application, Serial Number 214,931, now Patent No. 3,137,816, entitled, "Transmitter Automatic Frequency Control Network Including Modulation Cancelling Means," filed August 6, 1962, by Glenn W. Sellers and Frank D. McLin, and assigned to the assignee of the present invention. In addition, the synchronous detector shown and described herein, forms the subject matter of copending United States Patent Application Serial Number 214,930 entitled, "Clamping Synchronous Detector," filed August 6, 1962, now abandoned, by Frank D. McLin, and assigned to the assignee of the present invention.

In operation, the modulating signal feedback network is effective at frequencies above about 0.5 cycle per second (see FIGURE 5) while the AFC network is effective below about one cycle per second. As shown in FIGURE 6, the combined feedback response varies between about −46 decibels and −20 decibels.

Figure 7:
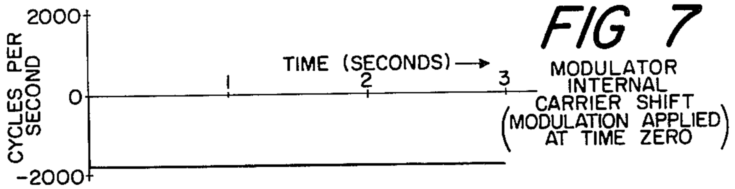
FIGURE 7 is a graphical presentation illustrating typically modulator internal carrier frequency shift.
Figure 8:
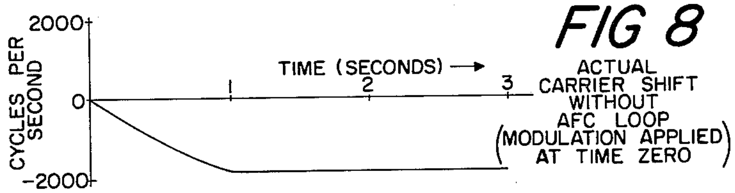
FIGURE 8 is a graphical presentation illustrating typically actual carrier frequency shift with only the modulating signal feedback network in the system.
Figure 9:
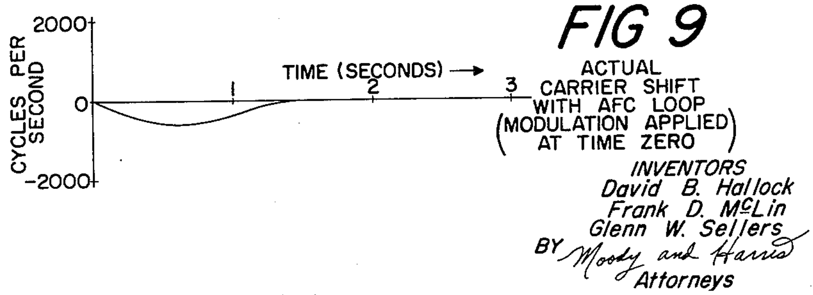
FIGURE 9 is a graphical presentation illustrating typically actual carrier frequency shift with both feedback networks in the system.

As shown by FIGURE 7, where the graph illustrates frequency deviations with respect to time, with no feedback applied, the modulator internal carrier shift was found to be about 1800 cycles per second. Adding only the modulating signal feedback loop does not correct this long term drift, as shown in FIGURE 8, and with only the modulating signal feedback network the actual carrier frequency slowly slews to a −1800 cycles per second carrier shift. However, as shown in FIGURE 9, with the AFC feedback network as well as the modulating signal feedback network, the carrier frequency, although starting to shift when modulation is applied each time, is quickly corrected so that carrier frequency shifts are substantially eliminated.

The purpose of modulating signal feedback loop 36 is to suppress FM oscillator distortion, incidental FM noise, and gain phase variation in the amplifier and modulator, as well as transient, or short term, carrier offset. The purpose of the AFC network, on the other hand, is to handle long term (two or more seconds) frequency shifts.

It should be evident from the foregoing to one skilled in the art that the dual feedback frequency modulation system of this invention provides means to maintain the carrier frequency of a direct frequency modulator substantially constant by correcting both long and short term frequency shifts, while at the same time suppressing distortion and noise.

What is claimed as our invention is:

1. A direct frequency modulation system including carrier frequency stabilizing means, said system comprising: an oscillator having a voltage sensitive output frequency determining network that is biased to establish a predetermined operational carrier frequency; means adapted to receive modulating signals over a wide range of frequencies and couple the same to said frequency determining network to cause said oscillator to be frequency modulated thereby; and first and second feedback networks connected in parallel between the output of said oscillator and said frequency determining network whereby said carrier frequency, exclusive of modulation thereon, is maintained substantially constant, and wherein said first feedback loop includes means whereby said received modulating signals are fed back to suppress oscillator distortion, noise, and short term carrier frequency shifts, and wherein said second feedback loop includes means whereby long term carrier frequency shifts are suppressed.

2. A direct frequency modulation system including carrier frequency stabilizing means, said system comprising: an oscillator having a voltage sensitive output frequency determining network that is biased to establish a predetermined operational carrier frequency; means adapted to receive modulating signals over a wide range of frequencies and couple the same to said frequency determining network to cause said oscillator to be frequency modulated thereby; and first and second feedback networks connected in parallel between the output of said oscillator and said frequency determining network whereby said carrier frequency, exclusive of modulation thereon, is maintained substantially constant, and wherein said first feedback network includes a frequency discriminator to complete a modulating signal feedback loop that suppresses transient carrier frequency shifts, and wherein said second feedback network completes an automatic frequency control loop for correcting long term carrier frequency shifts.

3. A direct frequency modulation system including carrier frequency stabilizing means, said system comprising: an oscillator having a voltage sensitive output frequency determining network that is biased to establish a predetermined operational carrier frequency; means adapted to receive modulating signals over a wide range of frequencies including the audio range, said means coupling received modulating signals to said frequency determining network to cause said oscillator to be frequency modulated thereby; a modulating signal feedback network connected between the output of said oscillator and said frequency determining network, said modulating signal feedback network including a frequency discriminator and suppressing oscillator distortion, noise, short term carrier offset and gain phase variation; and a frequency control feedback network connected between the output of said oscillator and said frequency determining network, said frequency control feedback network eliminating long term carrier frequency shifts.

4. A direct frequency modulation system including dual channel carrier frequency stabilizing means, said system comprising: an oscillator having a voltage sensitive output frequency determining network that is biased to establish a predetermined operational carrier frequency; input means for receiving modulating signals over a wide range of frequencies including both audio and superaudio frequencies, the output from said input means being coupled to said frequency determining network to cause said oscillator to be frequency modulated thereby; limiter means connected to said oscillator for receiving the output therefrom; a discriminator driver connected to the output from said limiter means; a first feedback network including a first frequency discriminator connected between the output from said discriminator driver and said input means, said first feedback network degeneratively coupling said modulating signals to said input means; an output amplifier connected to the output from said discriminator driver; a reference source generating an output frequency equal to said predetermined operational carrier frequency; and an automatic frequency control network connected between the output from said output amplifier and said frequency determining network, said automatic frequency control network including a second frequency discriminator for receiving the output from said output amplifier and the output from said reference source and producing an error signal whenever long term carrier frequency shifts occur at the output of said oscillator.

5. A direct frequency modulation system including carrier frequency stabilizing means, said system comprising: an oscillator having a voltage sensitive output frequency determining network that is biased to establish a predetermined operational carrier frequency; means adapted to receive modulating signals over a wide range of frequencies and couple the same to said frequency determining network to cause said oscillator to be frequency modulated thereby; and first and second feedback networks connected in parallel between the output of said oscillator and said frequency determining network whereby said carrier frequency, exclusive of modulation thereon, is maintained substantially constant, and wherein said first feedback loop includes means whereby said received modulating signals are fed back to suppress oscillator distortion, noise, and short term carrier frequency shifts, and wherein said second feedback loop includes means whereby long term carrier frequency shifts are suppressed, and wherein said first and second feedback networks have unlike but partially overlapping frequency response characteristics to assure that all short and long term carrier frequency shifts are substantially eliminated.

6. A direct frequency modulation system including carrier frequency stabilizing means, said system comprising:

an oscillator having a voltage sensitive output frequency determining network that is biased to establish a predetermined operational carrier frequency; means adapted to receive modulating signals over a wide range of frequencies and couple the same to said frequency determining network to cause said oscillator to be frequency modulated thereby; and first and second feedback networks connected in parallel between the output of said oscillator and said frequency determining network whereby said carrier frequency, exclusive of modulation thereon, is maintained substantially constant, and wherein said first feedback network includes a frequency discriminator to complete a modulating signal feedback loop that suppresses transient carrier frequency shifts, and wherein said second feedback network completes an automatic frequency control loop for correcting long term carrier frequency shifts, and wherein said feedback networks have partial overlapping frequency response characteristics to assure elimination of substantially all carrier shift due to the effects of modulation impressed upon said carrier.

References Cited by the Examiner

UNITED STATES PATENTS

| | | | |
|---|---|---|---|
| 2,550,519 | 4/51 | Bataille | 325—148 |
| 2,789,211 | 4/57 | Sprague | 331—11 |

DAVID G. REDINBAUGH, *Primary Examiner.*